July 18, 1944.  E. H. KOCHER  2,353,734
INDICATOR FOR CYCLIC LUBRICATING INSTALLATION
Filed Aug. 3, 1940
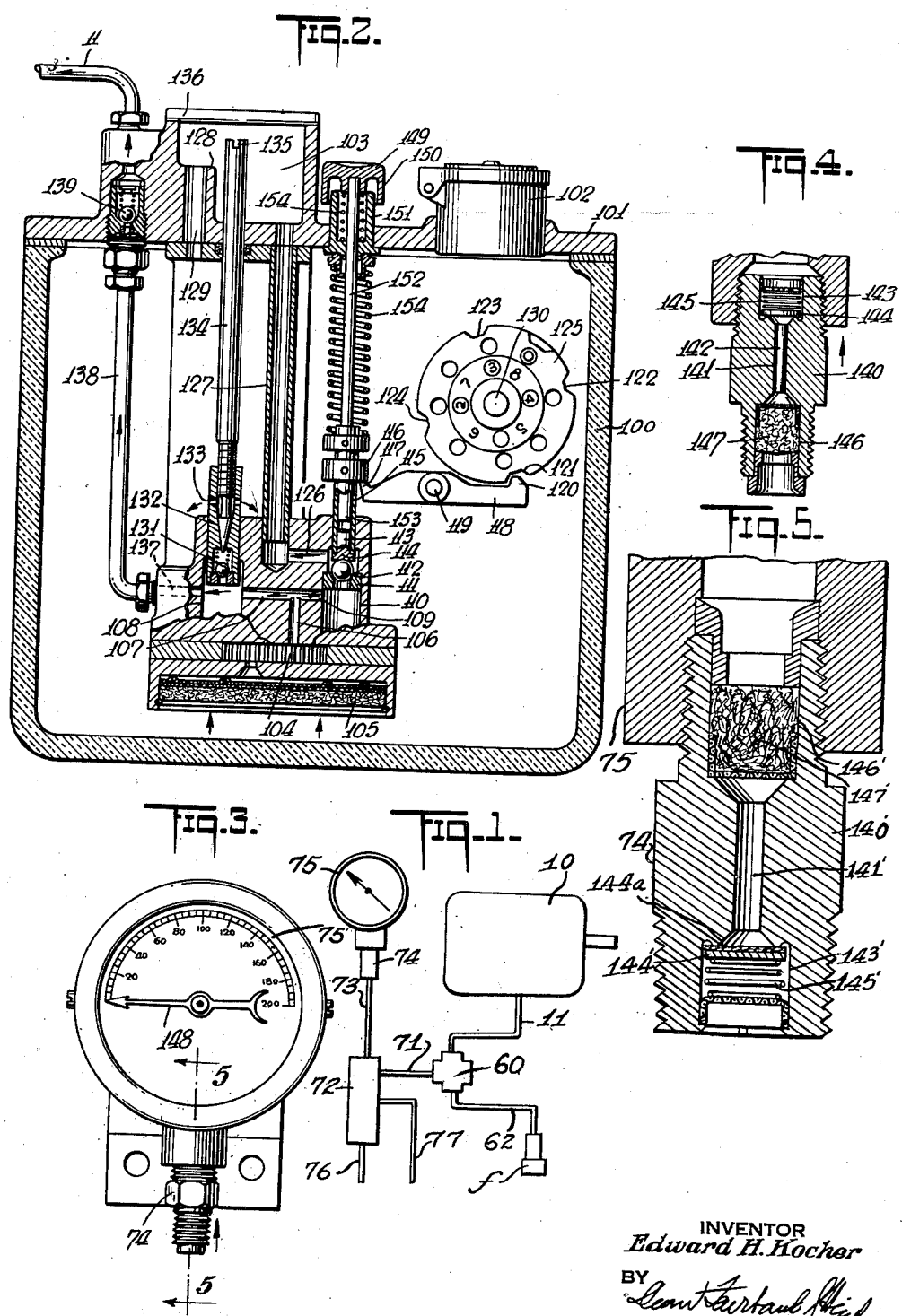
INVENTOR
Edward H. Kocher
BY
ATTORNEYS Patented July 18, 1944

2,353,734

UNITED STATES PATENT OFFICE 2,353,734

INDICATOR FOR CYCLIC LUBRICATING INSTALLATION

Edward H. Kocher, Boonton, N. J., assignor to Auto Research Corporation, a corporation of Delaware Application August 3, 1940, Serial No. 350,646

5 Claims. (Cl. 184—7)

The present invention relates to a lubricating installation, and it particularly relates to a lubricating installation as, for example, may be utilized in connection with mechanisms requiring relatively high pressure intermittent supplies of lubricant throughout the normal operation thereof.

Although not specifically limited thereto, the present invention will be particularly described in its application to the lubrication of mechanisms such as printing presses, for example, which throughout the operation thereof require intermittent supplies of lubrication and which may be provided with lubricating pressure and supply sources of the type described in connection with Patents No. 2,145,245 and 2,278,452.

In the installation shown in said prior patents, a gear pump is driven automatically from the mechanism to be lubricated and this gear pump normally discharges through an unobstructed return passage to the reservoir, with some of the lubricant being fed over the drive bearings of the gear pump which are included in the pressure unit. At all times the gear pump is in communication with a distributing conduit system consisting of or including internal bores in the mechanism to be lubricated, or external tubing having high restriction metering fittings, preferably pin restricted fittings, which afford an obstructing effect substantially greater than that encountered in the tubing or conduit system in the borings.

During the periods when the unobstructed passage permits flow of lubricant back into the reservoir, there will be substantially no emission pressure in the external distributing system and therefore there will be no flow past the high restriction flow metering feeding to the bearings to be lubricated.

It is only upon cutting off of said low obstruction or substantially unobstructed return, as for example, by a cam operating a valve, that a pressure will build up momentarily of, say, 25 pounds or more, which will cause a momentary discharge from the high restriction flow metering outlet fittings to the bearings to be lubricated. This pressure application may occur every five minutes or every five hours, as desired, and usually it has been found desirable to give pressure periods every 15 to 30 minutes.

In connection with such a system, however, it is desirable for an observer, at intervals which may vary considerably from those of the pressure impulse intervals, to be able to look at the machine and determine whether the lubricating installation is functioning properly to supply lubricant to the bearings.

Since the lubricating installation just described will only feed the bearings the proper amount of lubricant, it is not possible to observe by wetness of the bearings whether there is any excess of lubrication indicating that the bearings are being properly lubricated.

Where a pressure gauge is placed upon the system, such pressure gauge will under the pressure impulse indicate an elevated pressure of lubricant in the system, but as soon as the valve of the return passage is again opened, the lubricant pressure will immediately drop to zero and there will be no further indication that the system is operating.

It is therefore among the objects of the present invention to provide an improved indicating installation for a cyclic system of the character above described in which there will be a substantial indication of pressure application to the distributing system even though there be considerable lapses or intervals between successive lubricant pressure applications, during which the pressure is not applied to the system.

Another object of the present invention is to provide an improved signal or indicating system which will indicate operation of an intermittent cyclic lubricating installation even though there be substantial intervals between pressure application and even though attention be not directed to the machine at those particular instances when lubricant pressure is applied.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory to provide a gauge connected to the distributing system and preferably in the distributing system at a point relatively remote from the central pressure source or the gear pump, which will register the peak pressure immediately which is applied to the system by the central pressure pump, but which will only return slowly to zero after the pressure application.

For example, in the cyclic system having a pressure period every half hour, it is possible to dampen the return of the gauge indicating finger so that it will drop from a peak pressure of about 100 pounds per square inch to a decreased pressure of 20 to 30 pounds per square inch during a half hour interval without dropping to zero.

Then at any time that the operator or caretaker of the machine glances at the gauge, he will note a pressure indication, even though this may not be a peak pressure indication.

When the machine is idle during the night, the gauge will drop to zero and will not again indicate a pressure until there is the first pressure application from the central pump.

It is a special feature of the present invention that the restricting obstruction of the damper has substantially the same obstructing or restricting effect as the obstructions to the various bearings, and it is among the advantages of the present invention that the obstruction to the gauge feed line at the same time will permit instantaneous application of the full line pressure to the gauge.

Referring to the drawing, which shows one embodiment of the construction according to the present invention, but to which the present invention is by no means restricted, since many changes and variations may be made, all within the scope thereof, Fig. 1 is a schematic layout of a lubricating installation showing diagrammatically but one of the multiplicity of flow restriction fittings.

Fig. 2 is a transverse sectional diagrammatic showing of a central lubricating reservoir and pressure source;

Fig. 3 is an elevational view of a gauge and restriction unit assembly;

Fig. 4 is a transverse sectional view of a flow restriction or metering fitting used at various outlets to the bearings or surfaces to be lubricated, and Fig. 5 is a transverse sectional view taken upon lines 5—5 of Fig. 3 and showing the fitting between the gauge and the distributing system.

Referring to the layout of Fig. 1, the pump reservoir is diagrammatically illustrated at 10 and is shown in greater detail in Fig. 2 and is of the same general type as shown in the patents above identified.

The outlet of the pump-reservoir unit 10 connects with the tubing 11, which leads illustratively to a junction 60, from which conduits such as 62 feed different parts of the printing press or other mechanism, the outlets to the bearings being restriction fittings $f$ such as are shown in Fig. 4.

The junction 60 has an outlet line 71, which leads to the junction 72, which has a connection 73 to the fitting 74 leading to the gauge 75 and more fully shown in Fig. 5.

From the junction 72 there are outlet connections illustratively at 76 and 77 leading to other bearings equipped with high restriction flow metering outlet fittings.

The lubricating installation diagrammatically shown upon Fig. 1, is most desirably supplied with lubricant intermittently, say, at 15 to 30 minute intervals throughout operation of the printing press, and it is desirable for the operator to be able to tell whenever he glances at the gauge 75 whether the lubricating installation is in operating order.

The pump which may be utilized to supply the various bearings indicated upon Fig. 1, is shown diagrammatically upon Fig. 2. As indicated upon Fig. 2, the reservoir 100 carries a cover 101, with the lubricant inlet member 102.

The cover 101 has the well 103 which carries a drive mechanism for the gear pump (not shown).

The gear pump 104 receives the supply of lubricant past the inlet filter 105 and discharges this lubricant under pressure into the outlet bore 106, where the lubricant may flow through the bore 107 into the chamber 108 or into the bore 109 into the chamber 110.

The top of chamber 110 is closed off by the ring member 111, which forms a seat for the ball check 112.

The ball check has a follower member 113 having a concave portion 114 to rest on top of the ball check. The stem of the follower member 113 is enclosed in the sleeve 115, which is provided with a collar 116 under which fits the clevis claws 117 of the lever 118 pivotally mounted at 119.

As shown, the lever has a follower boss 120 which may be received in the recesses 121, 122, 123 or 124 of the control disc arrangement 125.

When, however, the projection 120 is out of registry with the recesses 122 to 124, the claw 117 will be elevated, lifting the follower member 113 against the spring 154, away from the ball 112 and permitting lubricant to flow substantially without obstruction from the chamber 110 past the valve seat 111 into the bore 126 and then into the vertical conduit 127 which feeds lubricant to the chamber 103 receiving the drive mechanism. The chamber 103 overflows over the shoulder 128 down through the bore 129 back into the reservoir 100.

The control disc will ordinarily be driven from the mechanism being lubricated through the shaft 130 so that the pressure impulses will be applied to the system at the desired intervals of say anywhere from 5 minute intervals to half hour intervals, and in connection with the usual type of printing press from 15 to 45 minutes.

From the chamber 108 the lubricant may flow past the spring seated ball check 131 and an adjustable needle valve 132 through the outlet passages 133 back to the reservoir. This needle valve 132 has a restricting effect of the order of that of the metering outlet fittings in parallel and may be adjusted through the elongated rod 134 having a fillister slot 135 which is accessible after removing the cover 136 of the well 103.

When the valve 112 is closed by the spring 154 against the seat 111 in the position shown in Fig. 2, the flow will take place out through the passageway 137, the tube 138 past the light spring seated inlet check valve 139 to the tube 11 and to the installation as shown in Fig. 1.

During the time the projection 120 is out of one of the recesses 121 to 124, however, no flow will take place past the needle valve 132 or into the system through the inlet pipe 11, but the lubricant will circulate at low pressure back into the reservoir through the tube 127 and the overflow 129.

However, when the valve 112 is placed against the seat 111, the full lubricant pressure of the gear pump 104 will be applied to the needle valve bypass 103, as well as the flow metering restriction fittings indicated in Fig. 1 and this pressure will be transmitted without substantial diminution to the gauge 75, and to the relatively remote flow metering fittings one of which is shown in Fig. 4.

As shown in Fig. 4, the flow metering restriction fitting has a body 140 and a central bore 141. In the outlet chamber 143 of the flow metering restriction fitting there is provided a spring seated check valve 144 having a seating spring 145. The valve 144 is tight seating, and will keep the lubricant conduits full and prevent entrance of air at a high fitting and emission of lubricant at a lower fitting. The inlet socket 146 receives the strainer 147.

The annular restriction between the bore 141 and the pin 142 has a restricting effect substantially greater than say a hundred times the restricting effect of the bearings and the conduit system and the crevice which is formed has a width of the order of a thousandth to several thousandths of an inch.

The restricting effect of all the high restriction flow metering fittings $f$ in parallel should be approximately the same as the restricting effect of the needle valve 132.

Except for the modifications hereinafter set forth, the fitting 74 shown in Fig. 5 and which is at the inlet to the gauge 75 is similar in construction to the flow metering restriction fittings shown in Fig. 4 and corresponding parts are identified by the same reference numerals primed. In Fig. 5 there is interposed between the valve plate 144' and the seat therefor a porous paper disk 144$^a$ which will give a slight porosity and permit slight leakage. The valve in the fitting 74 may have an opening pressure of 5 lbs. per square inch.

The pin restriction 142 is omitted in the fitting 74, since such restriction would tend to retard the application of the pressure to the pressure gauge 75, the central bore 141' affording a relatively coarse restriction.

In operation even though the operation of the cam 125 is so slow that there will only be pressure applications say every ten or fifteen minutes, nevertheless there will be a substantial pressure maintained at all times, as indicated by the needle 148 of the gauge 75.

It is, therefore, possible for the operator of the machine, who has other duties to perform, to glance only occasionally at the pressure gauge which will give an indication to him as to whether the system is properly operating.

When the pressure is applied, the pressure surge through the system, as shown in Fig. 1 and up to the metering device $f$ at a point remote from the central pump 10, will give a peak pressure of say, for example, 100 pounds per square inch, which pressure will very slowly drop due to leakage to about a pressure of about 20 to 30 pounds per square inch and ordinarily the pressure would not drop to zero, say until at least an hour has passed.

Where it is desired to test the system so as to get an immediate pressure application, a manual button device may be utilized, which manual press button is indicated at 149 in Fig. 2.

This button has a depending flange 150 which fits around the upstanding sleeve 151. The button has a depending rod 152, the lower end of which extends into the sleeve 115, as indicated at 153.

The coil spring 154 will normally press the button 149 upwardly to the position indicated for example in Fig. 2.

When, however, it is desired to test the system, the button 149 may be depressed, whereupon the lower end 153 of the rod 152 will strike the follower member 113, pressing the valve 112 against the seat 111 and causing a pressure impulse to be applied to the distributing system.

The peak pressure is higher with a cold machine, for example 100 pounds, and becomes lower as the temperature rises. This variation in pressure automatically compensates for changes in oil viscosity and assures a constant volume of oil being fed to the bearings independent of viscosity and temperature.

The peak pressure may be ascertained at any time by holding down the instant-feed button.

In operation, the pump will measure the total quantity of lubricant feed to the system, while the meter unit, such as shown in Fig. 4, will proportion this quantity according to the individual requirements of the bearings.

The pressure gauge damper construction of the present application is particularly suitable where pressure applications occur every 15 minutes or more, since with such ordinary pressure gauges during a large part of the time the pressure gauge is registering zero and the machine operator, who has other duties to perform, does not have any reliable indication of whether the lubricating system is functioning. With the present invention the pressure will be maintained during the intervals, and it is only necessary for the machine operator to glance occasionally at the pressure gauge, which will register the peak pressure immediately upon application and only return slowly to zero.

For example in a cyclic system having a pressure application every half hour, the peak pressure may be 100 pounds per square inch, and during the half hour interval, it will only drop to a pressure of about 20 to 30 pounds per square inch. Thus at any time that a machine operator glances at the gauge, there will be an indication, although such indication may not be the peak pressure, and unless the needle drops back to zero as it is at the beginning of a day's operation, the operator will be assured that the lubricating system is working.

It will be understood that many changes could be made in the particular features of gauge damper for cyclic system as shown, and many apparently widely different embodiments of this invention could be made without departing from the scope thereof, it is intended that all matter contained in the above description shall be interpreted as illustrative and not in a limiting sense.

What is claimed is:

1. In a centralized lubricating installation of the type that comprises a multiplicity of widely distributed bearings, a centralized source of lubricant therefor, a distributing system supplied from said source and having branches to said various bearings in parallel, each branch including a restricted flow proportioning metering fitting, a pump associated with said lubricant supply and functioning constantly during the operation of the lubricated mechanism, means for by-passing the output of said pump, means under control of the lubricated mechanism for closing said by-pass for only a small fraction of the time spaced by relatively long intervals during which the by-pass remains open, thereby to apply pressure lubricating impulses from the pump to the distributing system during short periods, to effect the feed of lubricant through the distributing system and the metering fittings thereof to the respective bearings and to release the pressure on the distributing system and discontinue lubricant feed thereto during the long intervals between lubrications; the combination therewith of means for ascertaining the operative effectiveness of the lubricating system, said means comprising a pressure gauge connected to the distributing system and a fitting between the gauge and the distributing system affording a minute leak for slow release of pressure from the pressure gauge after release of pressure on the distributing system, to register affirmative pressure upon said gauge for a substantial part of the interval between lubricating impulses.

2. The combination recited in claim 1 in which the pressure gauge is connected to a part of the distributing system remote from the pump and the fitting between the pressure gauge and the distributing system has a spring-seated valve with a facing of slight porosity which permits slight leakage.

3. The combination recited in claim 1 in which the pressure gauge is connected to a part of the distributing system and the fitting between the pressure gauge and the distributing system has a spring-seated valve having a porous paper disk facing which permits slight leakage past the seated valve.

4. The combination recited in claim 1 in which the by-pass has an associated manually operated means to permit the application of pressure to the distributing system at will to determine the operativeness of the system by the resultant reading of the gauge.

5. The combination recited in claim 1 in which the fitting between the gauge and the distributing system, like the flow proportioning metering fittings, has a restriction passage and has a spring-seated valve, but presents a relatively coarse restriction, the valve having a facing of porous character.

EDWARD H. KOCHER.